United States Patent [19]

Satake et al.

[11] Patent Number: 5,285,124
[45] Date of Patent: * Feb. 8, 1994

[54] BRUSHLESS INDUCTION SYNCHRONOUS MOTOR WITH TWO STATORS

[75] Inventors: Toshihiko Satake, Higashihiroshima; Yukio Onogi, Hiroshima, both of Japan

[73] Assignee: Satake Corporation, Tokyo, Japan

[*] Notice: The portion of the term of this patent subsequent to Oct. 19, 2010 has been disclaimed.

[21] Appl. No.: 928,057

[22] Filed: Aug. 11, 1992

[30] Foreign Application Priority Data

Aug. 28, 1991 [JP] Japan .................. 3-244632

[51] Int. Cl.[5] ................ H02K 16/00; H02K 23/62
[52] U.S. Cl. .................... 310/114; 310/124; 310/125
[58] Field of Search ............ 310/112, 114, 124, 125, 310/126, 162, 68 R, 68 D

[56] References Cited

U.S. PATENT DOCUMENTS

| | | | |
|---|---|---|---|
| 3,728,564 | 4/1973 | De Rugeris | 310/114 |
| 3,757,182 | 9/1973 | Chalmers et al. | 310/210 |
| 3,823,357 | 7/1974 | Sapper | 318/183 |
| 3,916,229 | 10/1975 | Litz et al. | 310/183 |
| 4,139,790 | 2/1979 | Steen | 310/162 |
| 4,476,408 | 10/1984 | Honsinger | 310/162 |
| 4,506,181 | 3/1985 | Jones et al. | 310/156 |
| 4,785,213 | 11/1988 | Satake | 310/114 |
| 4,945,296 | 7/1990 | Satake | 310/112 |

FOREIGN PATENT DOCUMENTS

| | | | |
|---|---|---|---|
| 1921626 | 11/1970 | Fed. Rep. of Germany | 310/114 |
| 49-86807 | 8/1974 | Japan | 310/114 |
| 54-29005 | 3/1979 | Japan | 310/114 |
| 978011 | 12/1964 | United Kingdom | 310/114 |

Primary Examiner—Steven L. Stephan
Assistant Examiner—C. LaBalle
Attorney, Agent, or Firm—Fish & Richardson

[57] ABSTRACT

An induction synchronous motor includes a unitary rotor having first and second pole type rotor cores, first and second stators, a voltage phase shifting means, and DC magnetic excitation circuits. Both of the rotor cores are mounted on a common rotor axis with a predetermined space between them. The first and second rotor windings are wound on the first and second rotor cores, respectively. A plurality of diodes is each connected in parallel between series-connection nodes of the first and second rotor windings. A plurality of rotor conductors is provided on the peripheries of and extend through the first and second rotor cores. A pair of short-circuit rings short-circuits both ends of the plurality of rotor conductors. The first and second stators surround the first and second salient pole type rotor cores, respectively, and have the same number of poles as the first and second rotor cores. The voltage phase shifting means selectively produces a phase difference of 0° for starting and accelerating operations and 180° for synchronous operation. The DC magnetic excitation circuits face the first and second salient pole type rotor cores, and have a different number of poles from the first and second stators.

2 Claims, 3 Drawing Sheets

BRUSHLESS INDUCTION SYNCHRONOUS MOTOR WITH TWO STATORS

BACKGROUND OF THE INVENTION (1) Field of the Invention

The present invention relates an induction synchronous motor of a brushless type.

(2) Description of the Prior Art

Generally, a synchronous motor requires a starting means for accelerating its rotor to a rotating speed of rotating magnetic fields produced by stator windings, that is, approximately to a synchronous speed, and a means for effecting DC excitation of rotor windings for the normal running operation.

An induction synchronous motor has been devised for omitting a starting means and having the synchronous motor itself posses a starting torque, so that the motor can first start as an induction motor with the rotor windings being short-circuited whereby no special means for starting the motor is required. However, such motor requires brushes since the rotor windings must be excited by DC current for synchronous operation of the motor. When the rotating speed of the rotor approaches the synchronous speed, the short-circuiting of the rotor windings is released so that the DC current is allowed to flow to the rotor windings through the brushes from the external DC current power source thereby producing magnetic poles in the rotor. These magnetic poles are attracted by the rotating magnetic fields produced by the stator windings so that the rotor is caused to be rotated at a synchronous speed. The brushes require maintenance checks resulting in extra costs for maintenance so that the development of a synchronous motor having a brushless configuration is strongly desired.

As conventional synchronous motors having a brushless configuration, there are motors of permanent magnet types or reluctance types but these are all limited to small capacity motors because induction starting is not possible and the starting torque is small. Such motors of an inductor type have disadvantages because magnetic passages therein are complex resulting in an increase in the size of the motors. The same is true in the motors using therein an AC exciter and a rotary rectifier means. A three-phase synchronous motor of a brushless type utilizing a harmonic magnetic field through a square wave voltage of an invertor by having a diode connected to the rotor windings has a disadvantage in that the magnetic magnetizing power of the rotor is insufficient and the output is not strong enough.

Also known is a brushless three-phase synchronous motor of a self-exicitation type. In such motor, a diode is inserted in one phase of three-phase stator windings whereby a static magnetic field is superimposed over a positive phase component rotating magnetic field and an alternating current voltage due to the static magnetic field is induced in the rotor windings to rotate in the synchronous speed. By having the voltage thus induced rectified through the diode, the rotor winding is DC-excited and a positive phase component of magnetic field acts thereby producing a synchronous torque. However, a drawback in such motor is that an induction starting is impossible since the starting is effected by eddy currents and the starting torque itself is small.

SUMMARY OF THE INVENTION

It is, therefore, an object of the invention to overcome the problems of the conventional synchronous motor and to provide an improved synchronous motor.

It is another object of the invention to provide a synchronous motor which can produce not only a large synchronization torque but also a large starting torque.

It is a further object of the invention to provide a synchronous motor which does not require any starting means and brushes.

According to one aspect of the invention, there is provided an induction synchronous motor comprising:

a unitary rotor having a first and a second salient pole type rotor core both being fixedly mounted on a common rotor axis with a predetermined space being provided therebetween; first and second rotor windings being wound on the first and second rotor cores, respectively, the adjacent ones along an axial direction of the first rotor windings and the second rotor windings being connected in series; a plurality of diodes each being connected in parallel between series-connection nodes of the first and second rotor windings; a plurality of rotor conductors being provided on peripheries of and extending through the first and second rotor cores; and a pair of short-circuit rings short-circuiting both ends of the plurality of rotor conductors;

a first and a second stator being provided surroundingly to face the first and second salient pole type rotor cores, respectively, and having the same number of poles as that of the first and second rotor cores;

a voltage phase shifting means which selectively produces a phase difference of 0° for starting and accelerating operation and 180° for synchronous operation, between a phase of a rotating magnetic field produced around the first salient pole type rotor core that is faced by the first stator and a phase of a rotating magnetic field produced around the second salient pole type rotor core that is faced by the second stator; and DC magnetic excitation circuits being provided to face the first and second salient pole type rotor cores, and having a different number of poles from that of the first and second stators, the DC magnetic excitation circuits being for magnetizing at the synchronous operation adjacent ones along the axial direction of the first rotor windings and the second rotor windings to opposite polarities.

The voltage phase shifting means applied to an induction motor having a plurality of stators has been disclosed in detail in the Japanese Patent Application No. Sho 61(1986)-128314, filed by the same assignee as that in the present application.

In the motor as arranged above, the motor is started as an ordinary induction motor by the operation of the voltage phase shifting means. The voltage phase shifting means causes the voltages induced in the two rotor windings and those in the plurality of rotor conductors to become the same phase due to the in-phase rotating magnetic fields produced by the two stator windings, that is, to allow the currents circulating respectively between the two rotor windings connected in series and among the plurality of rotor conductors to flow and, thus, not to allow such currents to flow to the diodes connected between the connecting nodes of the rotor windings.

After the starting of the motor, when the rotating speed of the rotor accelerates and approaches a speed of the rotating magnetic field which is a synchronous speed, the voltage induced in the rotor windings due to the rotating magnetic fields becomes small. The motor so far has been operating as an induction motor but, when the slip S approaches S=0.05, the motor is pulled into its synchronous operation. How this develops is hereinafter explained.

First, by the operation of the voltage phase shifting means, there is produced a phase difference of 180° between the phase of the rotating magnetic field produced around the rotor core surrounded by one of the two stators and the phase of the rotating magnetic field produced around the rotor core surrounded by the other of the two stators. When this has taken place, the currents which have been circulating between the rotor windings connected in series and among the rotor conductors, respectively, no longer flow there but flow through the diodes connected between the connection nodes of the rotor windings and no currents flow in the rotor conductors.

When the DC magnetic excitation windings provided to the stators are caused to operate together with the voltage phase shifting means, the magnetic excitation windings produce static magnetic fields and the rotor windings interlink with such static magnetic fields whereby AC voltages are induced. This AC voltage increases as the rotating speed of the rotor increases. The DC magnetic excitation circuits provided to the two stators are interlocked with the voltage phase shifting means in such a way that the static magnetic fields produced by the DC magnetic excitation windings magnetize the salient poles of the rotor cores in the same relative position in the axial direction to the opposite polarities when the phase difference of the voltage phase shifting means is 180°. Specifically, the induced AC voltages are applied to the diode connected between the connection nodes of the two rotor windings and, thus, the rectified currents flow in the respective rotor windings, whereby the magnetic poles are formed at the salient poles of the rotor cores. The magnetic poles thus formed are attracted by the rotating magnetic fields having a phase difference of 180°, produced by the stator windings, and accordingly the rotor is caused to rotate at a synchronous speed.

Here, some consideration is given to the synchronous torque. The phase of the rotating magnetic field produced by one of the two stator windings is phase-shifted by 180° with respect to that of the rotating magnetic field produced by the other of the two stator windings but, due to the static magnetic fields produced by the DC magnetic excitation windings, the direction of the currents which flow to the rotor windings of the rotor faced by one stator and have been rectified by the diode is reverse to that of the currents which have flow to the rotor windings of the rotor faced by the other stator and have been rectified by the same diode. Thus, the synchronous torques at the two rotor cores are in the same direction resulting in the summing up of the synchronous torques so that, although there are two stators, the total capacity of the brushless induction synchronous motor according to the invention is equal to the capacity of the conventional induction synchronous motor having brushes.

BRIEF DESCRIPTION OF THE DRAWINGS

The above and other objects, features and advantages of the present invention will be apparent from the following description of a preferred embodiment of the invention explained with reference to the accompanying drawings, in which.

DESCRIPTION OF THE PREFERRED EMBODIMENT

Now, referring to the accompanying drawings, an embodiment of the present invention will be explained, but it is to be noted that the invention is not limited to the embodiment. For example, the connection of the stator windings may be any of parallel, series, star and delta connections. Also, the phase may be two phases, three phases or other poly-phases.

The application filed by the same assignee as that in the present application has disclosed in detail the arrangement and operation of an induction motor having a plurality of stators, which arrangement is incorporated in the motor according to the present invention, in Japanese Patent Application No. Sho 61(1986)-128314. For example, as disclosed therein, the currents which flow in the rotor conductors circulate therethrough when the phase difference between the rotating magnetic field produced around the rotor faced by one stator and the rotating magnetic field produced around the rotor faced by the other stator is made, for example, in-phase or 0° in an electric angle by the operation of the phase shifting means, and the currents which flow in the rotor conductors flow through connecting members interconnecting the rotor conductors which members are arranged between the two rotor cores when the phase difference is made, for example, 180° in an electric angle.

The patent application referred to above shows the voltage phase shifting means as being one in which one of the stators is rotatably shifted with respect to the other stator, and another in which the connections of stator windings are changed by means of switch means. The voltage phase shifting means adopted in the present invention is one in which the connections of stator windings are changed since, with such arrangement, the change from 0° to 180° in an electric angle can be effected momentarily, so that the change of the speed to a synchronous speed is facilitated. Also, where a sensor for detecting the rotating speed, a DC magnetic excitation winding, a controller for the voltage phase shifting means are provided and interconnected, the change of the speed to a synchronous speed can be effected automatically so that, even when the step-out of the motor occurs, the synchronous motor operation can be momentarily changed to an induction motor operation by a signal from the sensor which detects the speed of rotation and this can prevent the occurrence of an accident which may otherwise occur in an ordinary synchronous motor due to a sudden stop caused by the step-out of the motor.

Figure 1:
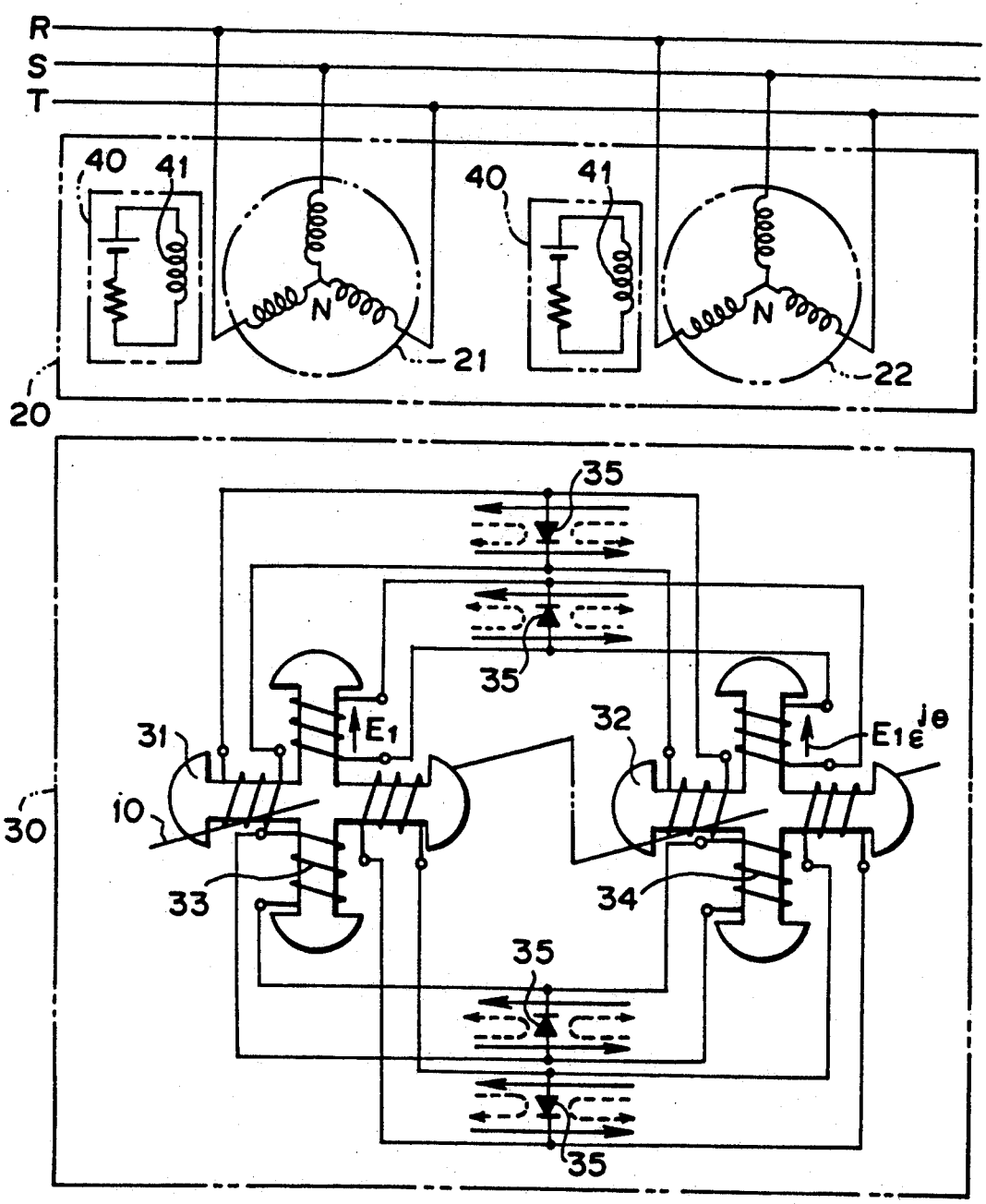
FIG. 1 is a diagram showing connections of wirings of the brushless induction synchronous motor according to the present invention, in which some rotor portions are omitted.

The embodiment of the induction synchronous motor according to the invention is now explained with reference to FIGS. 1, 2 and 3. In FIG. 1, the numeral 20 denotes a stator side of the motor and the numeral 30 denotes a rotor side of the same with some portions omitted from the drawings.

First, the stator side 20 is explained. At the stator side 20, there are two stator windings 21, 22 each of which is connected in a star-connection and is parallelly connected with three-phase AC power sources R, S and T. At the rotor side 20, there are provided DC magnetic excitation windings 41 for DC magnetic excitation circuits 40 independently of the stator windings 21, 22. Here, it should be noted that the stator windings 21, 22 and the DC magnetic excitation windings 41 are different from each other in the numbers of poles. For example, the number of poles of the stator windings 21, 22 is 4 poles and that of the DC magnetic excitation windings 41 is 6. By so doing, where the three-phase AC power is supplied to the stator windings 21, 22 and further the DC power is supplied to the DC magnetic excitation windings 41, there is no interference between the alternating magnetic fluxes produced by the AC power and the static magnetic fluxes produced by the DC power because the numbers of the poles are different from each other.

Next, the rotor side 30 of the motor is explained. At the rotor side 30, the rotor cores 31, 32 are fixedly mounted on a common rotary axis 10 and are in the form of salient pole type rotor cores having respectively the same 4 poles as in the above stator windings 21, 22. The salient poles of the rotor cores 31, 32 are provided with rotor windings 33, 34 wound thereon, respectively. The rotor windings 33, 34 are connected in series with each other, with the axially adjacent rotor windings 33, 34 being connected together, and diodes 35 are connected in parallel between the respective connection nodes of the rotor windings 33, 34. The portion omitted in FIG. 1 is further explained with reference to FIG. 3 which shows a perspective view of the rotor side 30. As seen therein, a plurality of rotor conductors 36, 37 which extend through the rotor cores 31, 32 are provided on the outer peripheries of the rotor cores 31, 32, and a pair of short-circuit rings 38, 39 are provided respectively on the two ends of the rotor conductors 36, 37, thereby forming a squirrel-cage type rotor conductor.

In the above arrangement having the stator windings 21, 22, the rotor windings 33, 34 and the rotor conductors 36, 37, it is assumed that the voltage induced in the rotor windings 33 faced by the stator windings 21 is E1 and similarly the voltage induced at the rotor conductors 36 is E2. Also, it is assumed that the voltage induced in the rotor windings 34 faced by the stator windings 22 is $E1e^{j\theta}$ and similarly the voltage induced at the rotor conductors 37 is $E2e^{j\theta}$. Here, the $\theta$ is a phase difference angle between the voltages.

Figure 2:
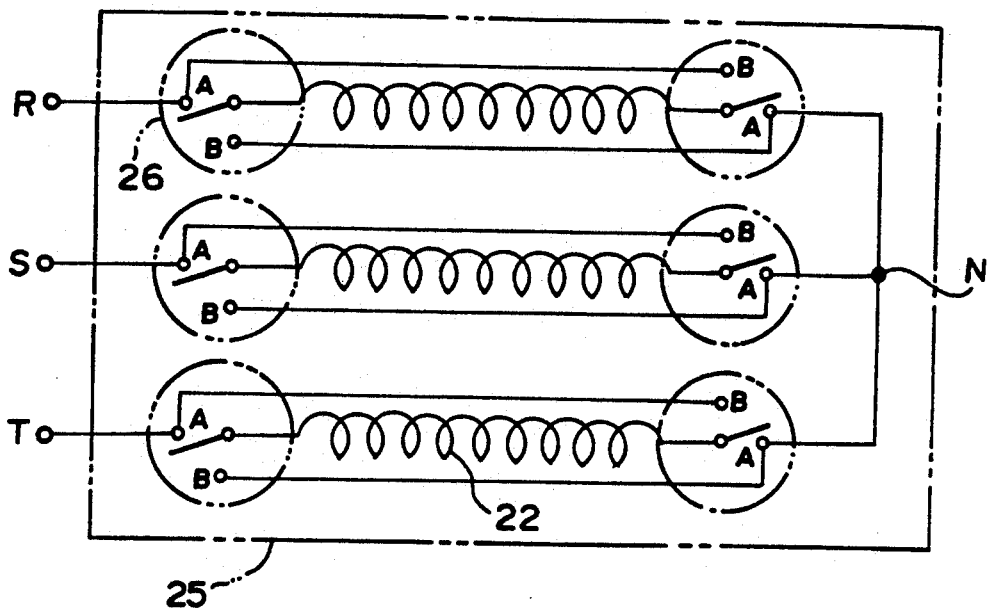
FIG. 2 is a diagram schematically showing a voltage phase shifting means used in the motor according to the present invention.
Figure 3:
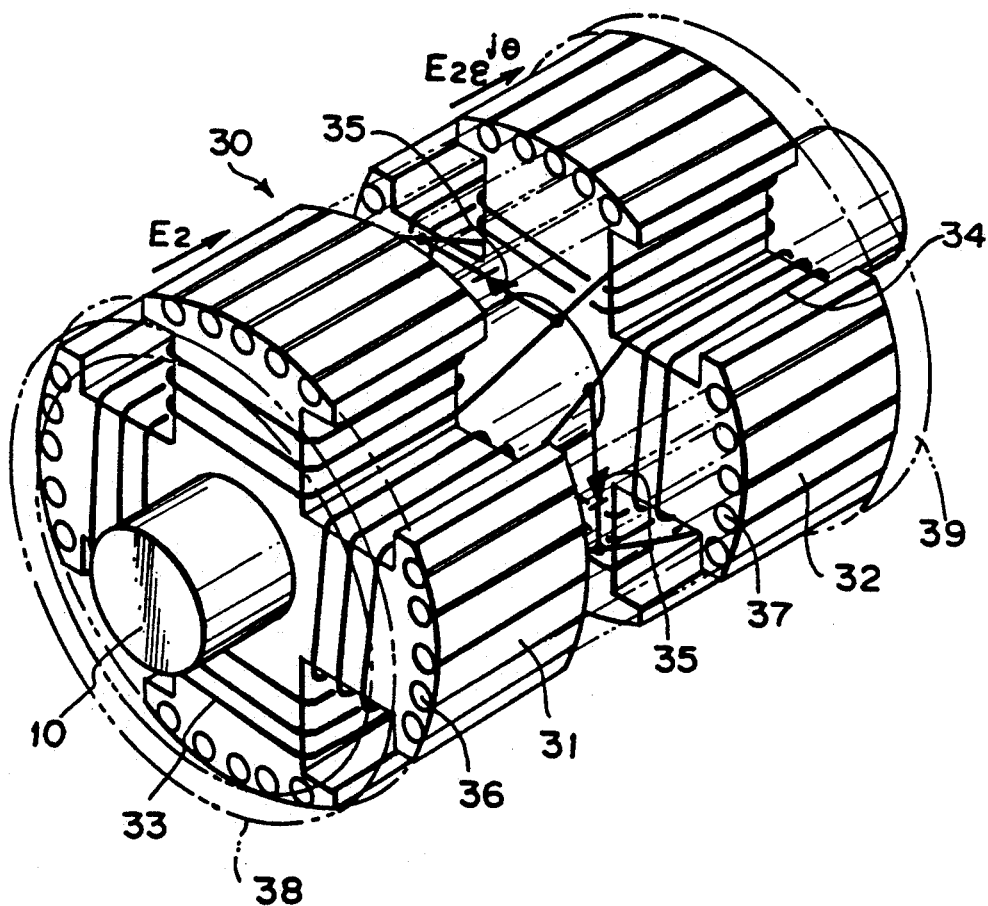
FIG. 3 is a perspective view of an arrangement at the rotor side of the brushless induction synchronous motor according to the present invention.

Now, with reference to FIG. 2, an example of the voltage phase shifting means used in the motor of the present invention is explained. For the present embodiment, the voltage phase shifting means is explained as being provided in the rotor windings 22 but this can of course be provided in the rotor windings 21. The voltage phase shifting means 25 shown is an electrically operated means in which the polarities of windings are changed by switching a plurality of switches 26 for obtaining a phase difference. Specifically, both the ends of the stator windings of a three-phase and four pole type are provided with the plurality of switches 26, respectively, and both the power supply sources R, S, T and the neutral point of star-connection are provided with switching terminals, respectively. Consequently, in FIG. 2, when the switches 26 are switched simultaneously to their B-side contacts from their A-side contacts, there is produced a phase difference of 180° between the phase of the rotating magnetic field around the rotor core 31 produced by the stator windings 21 and the phase of the rotating magnetic field around the rotor core 32 produced by the stator windings 22.

Now, the operation of the motor having the above configuration is explained. For starting the motor, the switches 26 of the voltage phase shifting means 25 are switched to their A-side contacts so that the phase difference angle $\theta$ formed between the rotor conductors 36 and 37 of the squirrel-cage type rotor and that formed between the rotor windings 33 and 34 become $\theta = 0°$. In this way, the three-phase currents flow from the three-phase power supply sources R, S and T to the stator windings 21, 22, so that the in-phase rotating magnetic fields are generated respectively around the rotor cores 31, 32, and the voltages are induced in the rotor conductors 36, 37 and also the rotor windings 33, 34. In this case, since the phase difference angle $\theta$ of the induced voltages is zero, i.e., $\theta = 0°$, the currents circulate in the rotor conductors 36 and 37 through the short-circuit rings 38 and 39 provided at both the ends of the rotor conductors 36, 37, and the current circulate in the rotor windings 33 and 34 in such a way that they circulate between the rotor windings 33 and the rotor windings 34 as shown by arrows with solid lines. Therefore, it should be noted that no currents flow in the diodes 35 which are connected between the connection nodes of the rotor windings 33, 34.

Figure 4:
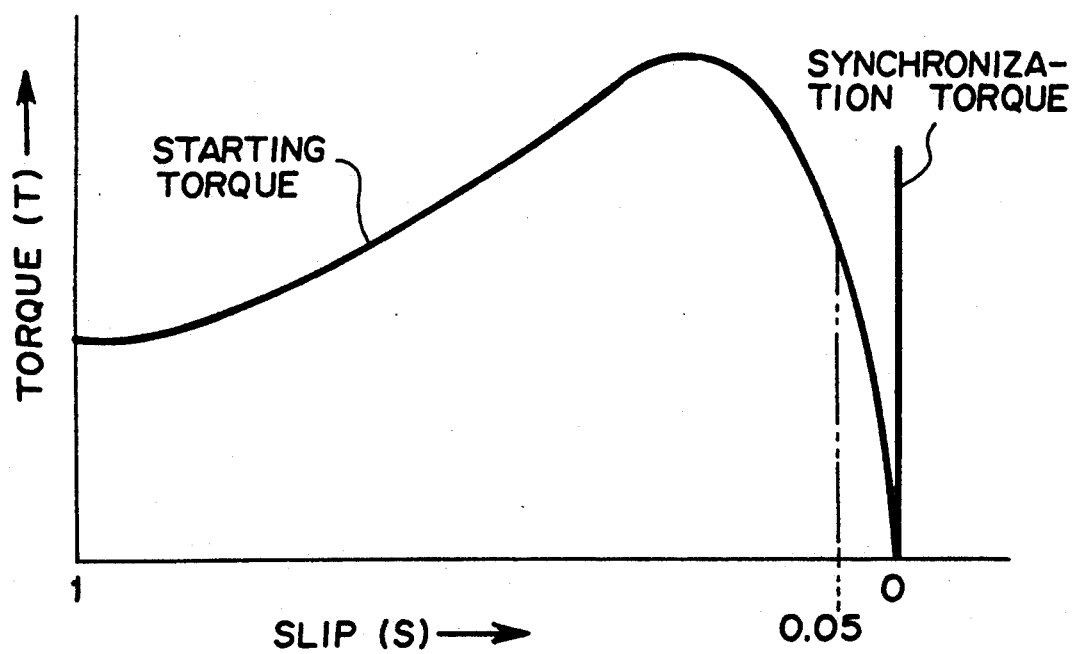
FIG. 4 is a graph showing an example of torque characteristics of the brushless induction synchronous motor according to the present invention.

The starting torque thus obtained is composite of the torque characteristics of the induction motor due to the rotor conductors 36, 37 making up the squirrel-cage type rotor and the torque characteristics of the induction motor due to the rotor windings 33, 34. With such starting torque, as shown in FIG. 4, the motor starts in the same torque characteristics as those in a conventional induction motor and it does not require any special means such as a starter.

After the starting of the motor, as the rotating speed accelerates, the slip S decreases and the induced voltage E2 in the rotor conductors 36, 37 and the induced voltage E1 in the rotor windings 33, 34 become small.

The operation of the motor up to the above is that as an induction motor and, when the slip S approaches $S = 0.05$, the motor is pulled into its synchronous operation. First, the switches 26 of the voltage phase shifting means 25 are switched to their B-side contacts so as to set a phase difference angle between the two rotating magnetic fields produced by the two stator windings 21, 22 to 180°. In this way, the phase difference angle $\theta$ in the induced voltages of the rotor conductors 36, 37 and the rotor windings 33, 34 becomes $\theta = 180°$.

Thus, the total voltage E of the induced voltages in the rotor conductors 36, 37 which are produced by the two rotating magnetic fields becomes:

$$E = E2 + E2e^{j180°} = E2 - E2 = 0,$$

so that the currents no longer flow in the rotor conductors 36 and 37.

Similarly, the currents which have been flowing from the rotor windings 33 to the rotor windings 34 no longer flow. However, since the induced voltages in the respective rotor windings 33, 34 by the respective rotating magnetic fields having a phase difference angle $\theta = 180°$ have become E1, −E1, it should be noted that the currents flowing in the rotor windings 33, 34 flow through the diodes 35 connected in parallel between the connection nodes of the rotor windings, and the currents rectified thereby flow in the rotor windings 33 and 34. Therefore, the function of the motor as that of an induction motor is lost.

At this point, the DC magnetic excitation circuits 40 provided at the stator side is caused to operate. That is, when the DC magnetic excitation windings 41 produce static magnetic fields around the rotor cores 31, 32, the rotor conductors 36, 37 and the rotor windings 33, 34 interlink with such static magnetic fields so that alternating voltages are induced therein. Since the DC magnetic excitation circuits 40 are interlocked with the voltage phase shifting means 25, the phase difference angle $\theta$ of the AC voltages induced in the squirrel-cage rotor conductors 36, 37 due to the static magnetic fields and that of the AC voltages induced in the rotor windings 33, 34 due to the same static magnetic fields become $\theta = 180°$. As a consequence, no currents flow in the rotor conductors 36, 37 because of the total induced voltage E being $E = E2 - E2 = 0$. On the other hand, it should be noted that there flow currents in the rotor windings 33, 34 through the diodes 35 connected between the connection nodes of the rotor windings, which currents are based on the AC voltages due to the static magnetic fields and are rectified by the diodes 35, whereby the magnetic poles are formed at the salient poles of the rotor cores 31, 32. The magnetic poles thus formed are attracted by the rotating magnetic fields produced by the stator windings 21, 22, and accordingly the rotor is caused to rotate at a synchronous speed.

The synchronous torque thus obtained is shown in the graph of FIG. 4. Since this synchronous torque is proportional to the strength of the static magnetic field described above, it is easy to make the synchronous torque large in the motor of the invention. As to the synchronous torque, during the synchronous operation, the rotating magnetic field produced by the stator windings 22 is phase-shifted by 180° with respect to that by the stator windings 21 by the voltage phase shifting means 25, and also the AC voltage induced in the rotor windings 34 due to the static magnetic field is phase-shifted by 180° with respect to that in the rotor windings 33, so that the rectified currents flow in the direction not to circulate in the rotor windings 33, 34 but flow through the diodes 35 from the respective rotor windings 33, 34 as shown by arrows with dotted lines. Thus, the synchronous torques at the two rotor cores are in the same direction resulting in the summing up of the synchronous torques so that, although there are two stators, the total capacity of the brushless induction synchronous motor according to the invention is equal to the capacity of the conventional induction synchronous motor having brushes.

As can be understood from the above, the brushless induction synchronous motor according to the invention produces a large starting torque since the motor starts in the same principle as that of the conventional induction motor and, therefore, the motor does not require any such special starting means as a starter. On the other hand, during the synchronous operation, since the rotor windings function as excitation magnetic windings, that is, the field windings, the present invention can provide a synchronous motor which produces a large torque and which does not require maintenance such as for brushes.

The present invention has been explained as being one in which the voltage phase shifting means for providing a phase difference between the induced voltages of the two rotor windings employs means by which the connections of the respective-phase stator windings are changed, that is, the connections of the two ends of the three stator windings are reversed simultaneously. However, it is possible to change the phase difference angle by a mechanical means wherein one of the stator cores is relatively rotated about the rotary axis with respect to the other stator core, whereby the change of the phase difference from $\theta = 0°$ to $\theta = 180°$ can be affected mechanically.

Further, although the present embodiment has been described as using a commercial power supply source, it is to be noted that a variable frequency power source with an invertor can be used for operating the motor at a desired synchronous speed.

As explained above, in the brushless induction synchronous motor according to the present invention, the motor starts with the same torque characteristics as in the conventional induction motor and, when the slip S approaches $S = 0.05$, the speed changes to a synchronous speed and the motor runs with the torque characteristics of the synchronous motor. Since no such means as a starter and brushes are required, the brushless induction synchronous motor according to the invention is not only simple in its construction or configuration but also is capable of starting with the same torque characteristics as in the conventional induction motor so that the motor can start and synchronously operate even under a loaded condition.

The fact that the brushless induction synchronous motor of the invention has both the torque characteristics of the induction motor and those of the synchronous motor means that this motor can be used with either of such torque characteristics. This is significant since, even when the motor steps out for any reason during the synchronous operation, the motor is capable of operating by having the torque characteristics changed from those of the synchronous motor to those of the induction motor, so that the motor never stops suddenly unlike the case in the conventional synchronous motor.

Thus, the present invention can provide a synchronous motor which, without the need of brushes and complex construction, is easy in maintenance and has large starting torque as well as large synchronous torque.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An induction synchronous motor comprising:
   a unitary rotor having a first and a second salient pole type rotor core both being fixedly mounted on a common rotor axis with a predetermined space being provided therebetween; first and second rotor windings being wound on the first and second rotor cores, respectively, the adjacent ones along an axial direction of the first rotor windings and the second rotor windings being connected in series; a plurality of diodes each being connected in parallel between series-connection nodes of the first and second rotor windings; a plurality of rotor conductors being provided on peripheries of and extending through the first and second rotor cores; and a pair of short-circuit rings short-circuiting both ends of the plurality of rotor conductors;

a first and a second stator being provided surroundingly to face the first and second salient pole type rotor cores, respectively, and having the same number of poles as that of the first and second rotor cores;

a voltage phase shifting means which selectively produces a phase difference of 0° for starting and accelerating operation and 180° for synchronous operation, between a phase of a rotating magnetic field produced around the first salient pole type rotor core that is faced by the first stator and a phase of a rotating magnetic field produced around the second salient pole type rotor core that is faced by the second stator; and DC magnetic excitation circuits being provided to face the first and second salient pole type rotor cores, and having a different number of poles from that of the first and second stators, the DC magnetic excitation circuits being for magnetizing at the synchronous operation the adjacent ones along the axial direction of the first rotor windings and the second rotor windings to opposite polarities.

2. An induction synchronous motor according to claim 1, wherein the voltage phase shifting means comprises a plurality of switches provided to either of the first and second stator windings, for switching respective connections between a neutral point and respective power source lines.

* * * * *

UNITED STATES PATENT AND TRADEMARK OFFICE
CERTIFICATE OF CORRECTION

PATENT NO.   : 5,285,124

DATED        : February 8, 1994

INVENTOR(S)  : Toshihiko SATAKE and Yukio ONOGI

It is certified that error appears in the above-identified patent and that said Letters Patent is hereby corrected as shown below:

Column 8, lines 15-16, delete "affected" and insert --effected--.

Signed and Sealed this

Eighth Day of November, 1994

Attest:

BRUCE LEHMAN

*Attesting Officer*          *Commissioner of Patents and Trademarks*